United States Patent [19]

Lauterbach et al.

[11] 4,339,491
[45] Jul. 13, 1982

[54] PROCESS FOR BONDING WALLPAPERS TO WALL INSULATIONS AND COMPOSITE SHEETING PREPARED IN ACCORDANCE THEREWITH

[75] Inventors: Uwe Lauterbach; Wolfgang Michel, both of Wiesbaden, Fed. Rep. of Germany

[73] Assignee: Hoechst Aktiengesellschaft, Frankfurt am Main, Fed. Rep. of Germany

[21] Appl. No.: 242,822

[22] Filed: Mar. 12, 1981

[30] Foreign Application Priority Data

Mar. 15, 1980 [DE] Fed. Rep. of Germany ....... 3010047

[51] Int. Cl.³ .......................... B32B 3/26; B32B 5/18; B32B 7/12; B32B 9/04
[52] U.S. Cl. ................................ 428/317.7; 156/328; 156/336; 428/318.4; 428/532; 428/533; 428/921
[58] Field of Search .............. 428/211, 310, 315, 921, 428/317.1, 317.3, 317.7, 318.4, 350, 532, 533, 920; 156/328, 336

[56] References Cited

U.S. PATENT DOCUMENTS 3,228,820  1/1966  Samson .............................. 428/315
3,502,539  3/1970  MacPhail, Sr. ..................... 428/921
4,076,878  2/1978  Norby ................................ 428/315
4,169,082  9/1979  Kusterer, Jr. ....................... 428/441
4,177,181  12/1979  Tsumuri et al. ..................... 156/333

FOREIGN PATENT DOCUMENTS 908336  8/1972  Canada .
1408894  10/1975  United Kingdom .
1584442  2/1981  United Kingdom .

Primary Examiner—William J. Van Balen
Attorney, Agent, or Firm—Schwartz, Jeffery, Schwaab, Mack, Blumenthal & Koch

[57] ABSTRACT

Disclosed is a process for bonding wallpaper to a wall insulation board or film of a foamed organic polymer, comprising the steps of providing a layer of wall insulation comprising a foamed organic polymer; providing a layer of wallpaper; applying to the surface of either the layer of wall insulation or the layer of wallpaper a coating of an adhesive composition suitable for bonding the layers together, wherein the adhesive composition comprises an amount of a flame retardant agent sufficient to render the adhesive composition flame retardant; and bonding the layer of wallpaper to the layer of wall insulation. Also disclosed is a composite sheeting produced by this process.

5 Claims, 1 Drawing Figure

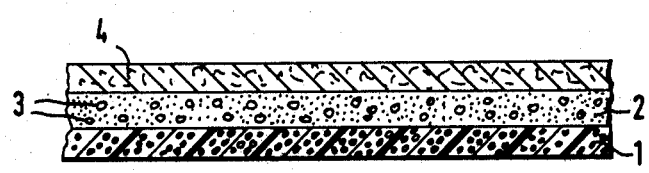

PROCESS FOR BONDING WALLPAPERS TO WALL INSULATIONS AND COMPOSITE SHEETING PREPARED IN ACCORDANCE THEREWITH

BACKGROUND OF THE INVENTION

The present invention relates to a process for bonding wallpapers to wall insulating boards or films made of a foamed polymer, and to the resulting composite sheeting which may be used as a wall covering.

Wall insulating boards or films, in particular those of foamed polystyrene, are commonly known and are used for covering walls prior to pasting on the wallpaper. Such insulating boards are available as folded and unfolded boards or as film rolls. In general, their spatial form is rectangular, with their thickness being very small in comparison to their width and length. With the aid of these boards and films it is possible, e.g., to cover wall cracks, to achieve a certain thermal insulation and to prevent the deposit of moisture.

A certain disadvantage of wall insulating boards or films of this kind may arise from the fact that, in case of the action of extremely high temperatures, caused, e.g., by flames, the typically thermoplastic polymer begins to melt and/or its foam structure starts to break down, even before the flamepoint of the wallpaper pasted on it is reached. Thus a cavity is produced between the wallpaper and the wall, which contributes to a rapid burning up of the wallpaper as soon as its flamepoint is reached. In order to eliminate this disadvantage, it is known to render fireproof either the wall insulating board or film, or the wallpaper, or both. In many cases this special measure is not required, however, so that the manufacture of these products becomes unnecessarily complicated and expensive.

SUMMARY OF THE INVENTION

It is therefore an object of the present invention to provide an improved process for bonding wallpaper to wall insulating boards or films.

A further object of the invention is to provide a process of this type wherein the composite sheeting prepared has an improved resistance to heat, and especially to flames without it being necessary to render the wall insulating material itself or the wallpaper bonded to it, or to be bonded to it, fire-proof.

It is also an object of the invention to provide an improved composite wall covering structure resulting from the process according to the invention.

In accomplishing the foregoing objects, there has been provided according to the present invention a process for bonding wallpaper to a wall insulation board or film of a foamed organic polymer, comprising the steps of providing a layer of wall insulation comprising a foamed organic polymer; providing a layer of wallpaper; applying to the surface of either the layer of wall insulation or the layer of wallpaper a coating of an adhesive composition suitable for bonding the layers together, wherein the adhesive composition comprises an amount of a flame retardant agent sufficient to render the adhesive composition flame retardant; and bonding the layer of wallpaper to the layer of wall insulation.

In accordance with another aspect of the present invention there has been provided a composite sheeting for covering walls, comprising a base layer of a foamed organic polymer, a layer of adhesive contiguous to the base layer, and a layer of wallpaper contiguous to the adhesive layer, wherein the adhesive layer applied between the base layer and the wallpaper layer comprises an amount of a flame retardant sufficient to impart a flame retardant effect of the composite sheeting.

Other objects, features and advantages of the present invention will become apparent from the detailed description of preferred embodiments which follows, when considered together with the attached FIGURE of drawing.

BRIEF DESCRIPTION OF THE DRAWING

The FIGURE of drawing is a cross-sectional view of a composite sheeting produced according to the present invention.

DETAILED DESCRIPTION OF PREFERRED EMBODIMENTS

The present invention provides a process for bonding wallpaper to wall insulating boards or films of a foamed organic polymer wherein the adhesive used for bonding contains a flame retardant.

The board or film of a foamed organic polymer is preferentially made of extruded polystyrene foam. Manufacturing processes for such boards and films and also the materials from which they are composed are, e.g., described in German Gebrauchsmuster No. 75 19 827; No. 76 16 504; No. 76 16 521; and No. 79 31 745; in British Pat. No. 1,046,374; in German Auslegeschrift No. 17 94 174 or in German Offenlegungsschrift No. 25 47 082. The disclosures of these publications are hereby incorporated by reference. In general, the wallpapers bonded to them are made of pulps which are prepared on the basis of cellulose fibers, but paper pulps which, in addition to cellulose fibers also contain synthetic fibers, such as, e.g., polyolefin fibers, or which are completely composed of synthetic fibers are also used. In addition to these, wallpapers which are produced from textile base materials or from synthetic polymer films, may also be used in the process according to the present invention.

Before the wallpaper is bonded thereto, the wall insulating board of a foamed polymer may be coated with a coupling agent, in order to increase the adhesion of the wallpaper. This coupling agent may also be applied directly by the manufacturer of the wall insulation.

In general, the various adhesives used for bonding wallpaper are composed of natural, semi-synthetic and/or synthetic polymers. In the course of their practical use, special preference has been given to those adhesives which are water-soluble or at least soften in water, for they facilitate the removal of the wallpaper from the walls and/or from the wall insulations, and they can be removed by environmentally acceptable methods, without the aid of organic solvents. Within the framework of this invention, the following polymers are preferably employed: alkyl celluloses, such as methyl cellulose and ethyl cellulose, hydroxy alkyl celluloses, such as hydroxy ethyl cellulose and mixed ethers thereof, such as methyl hydroxy ethyl cellulose, methyl hydroxy propyl cellulose or ethyl hydroxy ethyl cellulose, as well as mixed ethers carrying an ionic substituent, such as methyl carboxy methyl cellulose; starch ethers; substituted and unsubstituted vegetable gums such as carob bean flour; polyvinyl alcohol; polyvinyl ethers; polyvinyl esters, such as polyvinyl acetate; polyvinyl pyrrolidone; polyurethanes; carboxy methyl cellulose or sulfoethyl cellulose; oxidized cellulose; alginates; alginic esters; carboxy methyl starch; starch phosphates; polyacrylamide; polyacrylates; and mixtures of these compounds. Of the polymers, the polysaccharide derivatives are preferably used as the base material for the adhesive. They can be applied in an aqueous medium. They are commonly sold in the form of powders or granules to industrial or private users who mix them with water, so that a paste is obtained which is ready for use and can be easily distributed. Apart from the already mentioned adhesive polymers, the adhesives may additionally contain one or several non-adhesive compound(s) which can be dispersed or dissolved in water, and which, e.g., influence the bonding strength, facilitate the mixing step or act as dispersing agents. Examples of them are: polyalkylene glycols, polyethylene, polyalkylene glycol ether or polyalkylene glycol ester, polyolefin oxides, fatty alcohols, fatty acids, soaps, glycerides, fatty amides, wax alcohols, waxes, ester waxes, saccharides or salts. Furthermore, the usual additives, such as surfactants, anti-foaming agents, preserving or perfuming agents, fillers or pigments may be added.

The adhesive according to this invention also comprises a flame retardant which may either be added by the manufacturer when the adhesive granules or powder are produced, or which alternatively may be added by the user when mixing the powder with water to form the paste. The flame retardant is preferably present in the form of small particle solids capable of flowing and which are soluble or dispersible in water, but it may also be used in a fluid form, either alone or on a carrier material, such as, e.g., a silicate. Relative to the bonding portion of the adhesive, the amount of the flame retardant varies between about 20 and 80% by weight. Appropriate flame retardants or adhesives which have been rendered fire-proof are, e.g., described in German Pat. Nos. 12 88 313 (1,3,5-s-hexahydro-triazines), and 15 94 190 (mixtures of polyvinyl alcohol, polyethylene imine and acids), or in German Offenlegungsschriften Nos. 24 36 166 (reaction products of lignin compounds and urea compounds), 25 12 318 (organic phosphorus compounds, organic bromine compounds, organic chlorine-phosphorus compounds, ammonium polyphosphates, antimony trioxide), 25 32 521 (2-oxo- or 2-thiono-1,3,2-dioxaphosphorinanyl derivatives), 25 41 555 (mixtures of alkali silicate, asbestos fibres, polysaccharide derivatives and silicones), 25 59 127 (bromine-substituted carbamoyl derivatives), 27 10 498 (metal salts of phosphonocarbonic acids or phosphonic acids), 27 32 561 (salt containing aqueous solutions comprising at least 3 ions selected from the group: ammonium, zinc, alkaline earth metal, chloride, bromide and phosphate), 27 59 132 (reaction products of phosphoric acid and reduceable sugars), 28 44 132 (reaction products of aldehydes and ethylene urea, hexahydropyrimidine-2-one or piperazine), 29 00 155 (reaction products of phosphoric acid and reduceable sugars) and No. 29 00 535 (magnesium sulfate heptahydrate, magnesium sulfite, magnesium monohydro-orthophosphate). Of the flame retardants, the compounds in salt form are preferably used, especially phosphates or polyphosphates, such as ammonium polyphosphate or sulfamates, such as ammonium sulfamate. In general, fire retardants are compositions which either promote the carbonization process or form barrier layers or insulating layers (see, e.g., Roempp's Chemielexikon, 7th edition, 1976, Franck'sche Verlagshandlung, pp. 1138 ff.).

The process according to the present invention can be employed either directly by the manufacturer, i.e., by producing ready-made composite sheeting suitable for covering walls, where the wallpaper has already been bonded to the wall insulation, whereby the user need only bond this composite sheeting to the wall, or alternatively, it may be employed by the user, i.e., who combines the individual components, wall insulating board or film, adhesive and wallpaper, to form the composite sheeting. In cases where the flame retardant has not yet been added to the adhesive by the manufacturer, the flame retardant is added by the user prior to applying the adhesive. Due to the special flame-retardant properties of the adhesive, the composite sheeting comprising a foamed polymer board or film, an adhesive and a wallpaper, has an increased fire-resistance compared with an analogously built-up sheeting which does not contain the flame-retardant according to the present invention. The addition of the flame retardant to the adhesive represents a simple method of applying said additive in only those cases where it is actually required, such as, e.g., in rooms with open fires. It is therefore no longer necessary to render fire-proof the other components of the composite sheeting, i.e., wall insulation and wallpaper. By using the process proposed by this invention, it is also possible to abandon the expensive separate production and storage both of unmodified and fire-proof wall insulation boards and wallpapers.

The attached drawing FIGURE shows a section of a composite sheeting which has been prepared according to the present invention, wherein, however, the thicknesses of the individual layers are not to scale. Between the board or film 1 of a foamed polymer and the wallpaper 4, there is provided the adhesive layer 2, into which the flame retardant particles 3 are embedded.

By means of the following examples, a more detailed description of this invention is given, it being understood that the examples are merely illustrative and not limiting.

EXAMPLE 1

In accordance with DIN 4102, part 1, pos. 6.2., and similar to DIN 53 438 "Testing of combustible materials, reaction against a flame of a burner; general remarks", a sample which is built-up as described hereafter is tested. The sample comprises a base plate of asbestos cement having a thickness of 5 mm and a surface area of 90 mm×230 mm, to which a wall insulation of foamed extruded polystyrene having a thickness of 3 mm is bonded by means of a commercial synthetic adhesive dispersion which can be distributed with a scraper. Then a coupling agent layer of the same adhesive, which has been additionally diluted with water, is applied and this foundation is dried. Then a commercial embossed wallpaper having a weight of 180 g/m² is bonded to it by means of an adhesive containing 50 parts by weight of a methyl hydroxy ethyl cellulose having a viscosity of 1500 mPa·s (according to Hoeppler in a 2% aqueous solution at 20° C.) and 50 parts of a flame retardant based on ammonium polyphosphate, which is dispersible in water and is mixed with water in a ratio of about 1:20 to form a paste. Whereas a sample which has been prepared with a paste to which no flame retardant has been added is classified as "easily inflammable", the sample prepared in accordance with this invention is of "standard inflammability", i.e., it has a higher flame-point.

EXAMPLE 2

The same process is followed as described in Example 1, except that a wallpaper paste containing 50 parts by weight of a water-soluble flame retardant based on ammonium sulfamate is used. The properties are the same as indicated in Example 1.

EXAMPLE 3

The same process is followed as described in Example 1, except that a wallpaper paste containing 25 parts by weight of each of the flame retardants described in Examples 1 and 2 is used. The properties are the same as indicated in Example 1.

EXAMPLE 4

The process employed is the same as described in Example 1, except that there is used a commercial synthetic adhesive dispersion which can be distributed by means of a scraper or of a roller for bonding the wall insulation to the base plate, a size-print wallpaper having a weight of 120 g/m$^2$ and a wallpaper paste containing 35 parts by weight of a methyl hydroxy ethyl cellulose having a viscosity of 6000 mPa·s and 30 parts by weight of each of the flame retardants described in Examples 1 and 2. The properties are the same as indicated in Example 1.

What is claimed is:

1. A process for bonding wallpaper to a wall insulation board or film of a foamed organic polymer, comprising the steps of:

providing a layer of wall insulation consisting essentially of a foamed polystyrene;

providing a layer of wallpaper;

applying to the surface of at least one of said layer of wall insulation or said layer of wallpaper a coating of an adhesive composition suitable for bonding said layers together, wherein said adhesive composition consists essentially of water, a polysaccharide derivative as the bonding component and an amount of a flame-retardant agent sufficient to render said adhesive composition flame-retardant; and bonding said layer of wallpaper to said layer of wall insulation.

2. A process as claimed in claim 1, wherein said flame retardant agent comprises a flowable particulate composition which is soluble or dispersible in water.

3. A process as claimed in claim 1, wherein the polysaccharide derivative comprises a water-soluble cellulose ether.

4. A process as claimed in claim 1, wherein the adhesive composition contains between about 20 and 80% by weight of the flame retardant, relative to the bonding portion of the adhesive.

5. A composite sheeting for covering walls, consisting essentially of a base layer of a foamed polystyrene, a layer of adhesive contiguous to said base layer, and a layer of wallpaper contiguous to said adhesive layer, wherein the adhesive layer applied between the base layer and the wallpaper layer consists essentially of a polysaccharide derivative as the bonding agent and an amount of a flame-retardant sufficient to impart a flame-retardant effect to said composite sheeting.

* * * * *